(12) United States Patent
Nordbruch et al.

(10) Patent No.: US 9,278,620 B2
(45) Date of Patent: Mar. 8, 2016

(54) METHOD AND DEVICE FOR OPERATING A VEHICLE, COMPUTER PROGRAM, AND COMPUTER PROGRAM PRODUCT

(75) Inventors: Stefan Nordbruch, Kornwestheim (DE); Roland Galbas, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 66 days.

(21) Appl. No.: 14/131,587

(22) PCT Filed: May 10, 2012

(86) PCT No.: PCT/EP2012/058641
§ 371 (c)(1),
(2), (4) Date: Jun. 5, 2014

(87) PCT Pub. No.: WO2013/007418
PCT Pub. Date: Jan. 17, 2013

(65) Prior Publication Data
US 2014/0288738 A1    Sep. 25, 2014

(30) Foreign Application Priority Data
Jul. 8, 2011  (DE) .......................... 10 2011 078 869

(51) Int. Cl.
| B60L 3/00 | (2006.01) |
| B60L 11/00 | (2006.01) |
| B60L 3/04 | (2006.01) |
| B60L 3/12 | (2006.01) |
| B60L 11/18 | (2006.01) |

(52) U.S. Cl.
CPC ................. *B60L 3/04* (2013.01); *B60L 3/0069* (2013.01); *B60L 3/0076* (2013.01); *B60L 3/12* (2013.01); *B60L 11/1809* (2013.01); *B60L 11/1816* (2013.01); *B60L 2240/12* (2013.01); *B60L 2240/461* (2013.01); *B60L 2250/16* (2013.01); *Y02T 10/7005* (2013.01); *Y02T 90/14* (2013.01)

(58) Field of Classification Search
USPC .................................. 701/22, 36, 70; 180/65.1
See application file for complete search history.

(56) References Cited

U.S. PATENT DOCUMENTS

| 5,461,298 | A | * | 10/1995 | Lara et al. ...................... 320/109 |
| 5,596,258 | A | | 1/1997 | Kimura et al. |
| 8,989,954 | B1 | * | 3/2015 | Addepalli et al. ........... 701/32.3 |
| 2010/0072946 | A1 | | 3/2010 | Sugano |
| 2011/0172839 | A1 | * | 7/2011 | Brown et al. ................. 700/292 |
| 2012/0041855 | A1 | * | 2/2012 | Sterling et al. .................. 705/34 |
| 2013/0029193 | A1 | * | 1/2013 | Dyer et al. ...................... 429/62 |
| 2013/0110340 | A1 | * | 5/2013 | Park et al. ....................... 701/22 |

(Continued)

FOREIGN PATENT DOCUMENTS

| CN | 101073990 A1 | 11/2007 |
| CN | 101563253 A1 | 10/2009 |

(Continued)

*Primary Examiner* — Yonel Beaulieu
(74) *Attorney, Agent, or Firm* — Kenyon & Kenyon LLP

(57) ABSTRACT

A method, a computer program and a computer program product for operating a vehicle, which includes as a drive device a least one electric motor, that is associated with at least one electric store, wherein the electric store is charged by an external energy source when the vehicle is at rest. During the charging process, at least initially at least one testing device of the vehicle is activated for monitoring the charging process as well as the rest state of the vehicle, and only when an error state is detected by the testing device at least one safety device of the vehicle is activated.

14 Claims, 1 Drawing Sheet

(56) References Cited

U.S. PATENT DOCUMENTS

2014/0062397 A1* 3/2014 Dyer et al. .................... 320/109
2014/0228168 A1* 8/2014 Kaufman et al. ................. 477/5

FOREIGN PATENT DOCUMENTS

DE   10 2009/016895   10/2010
WO      2008084362 A1   7/2008

* cited by examiner

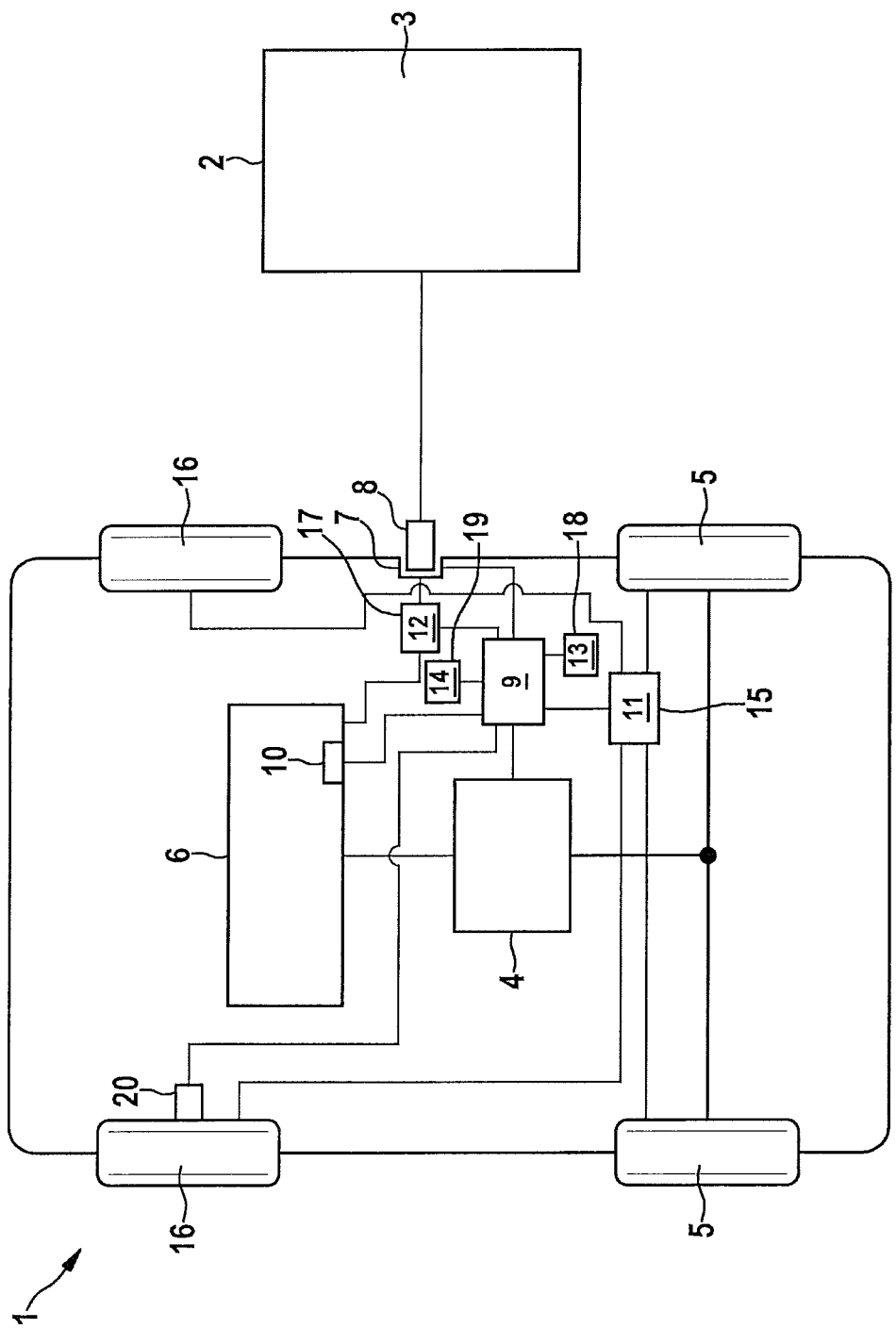

METHOD AND DEVICE FOR OPERATING A VEHICLE, COMPUTER PROGRAM, AND COMPUTER PROGRAM PRODUCT

FIELD OF THE INVENTION

The present invention relates to a method and a device for operating a vehicle, which comprises as a drive device at least one electric motor that is associated with at least one electric store, the electric store being charged by an external energy source when the vehicle is at rest. The present invention also relates to a computer program as well as a computer program product.

BACKGROUND INFORMATION

Methods and devices of the above named type are known from the related art. The use of high voltage and currents in vehicles that have an electric motor as drive device, especially so-called electric vehicles, encompassing only one or more electric motors as drive devices, increases the risk for the user and operator of the vehicle. Especially the charging process is a hazard. Due to unsafe conditions during the charging process of the vehicle using an external energy source, for example at a charging station, a critical situation may arise for example if the vehicle rolls away or the charging process is faulty. The likelihood of errors rises with increasing charging time.

In order to avoid or control such critical situations, current approaches provide for all control units to be operated in fully active mode during the charging process, in order to capture any error conditions and to maintain the vehicle in a safe condition. This has the disadvantage of high energy consumption required for the fully active control units as well as the greatly increased demands on the life of control units and components, which are now operated and therefore strained also during the charging process. Overall, this increases costs, especially maintenance costs, as well as the environmental pollution caused by the vehicle.

SUMMARY OF THE INVENTION

The present invention has the advantage of increasing the life of the vehicle system components and reducing the overall energy consumption. The method according to the invention is characterized by the features of claim 1 wherein at least initially only at least one testing device of the vehicle is activated to monitor the charging process as well as the rest state of the vehicle, and wherein only when an error state is detected by the testing device at least one safety device of the vehicle is activated. The present invention thus provides for the activation of only those testing devices that monitor the charging process as well as the stationary state of the vehicle, instead of, as is currently the case, activating all control units or testing and safety devices of the vehicle.

For this purpose one or more testing devices may be utilized. As testing devices sensors may be provided, of which one for example monitors the flow of current during the charging process and another monitors the rotational speed of wheels of the vehicle. The sensors may be associated with one or more testing devices. Only when one of the sensors detects a deviation from the desired condition, that is, an error state, are one or more of the devices that serve to safeguard the vehicle, so-called safety devices, activated. Depending on the error state it may be sufficient to activate only one safety device. Multiple safety devices of the vehicle may be activated in case an error state is detected by one or more of the testing devices. Thus during the charging process, at least in a normal state, only the at least one testing device of the vehicle is active and draws energy from the system or the electric store. Only when an improper charging process is detected or when the vehicle is not at rest, but for example is in the process of rolling away from the charging station, are the safety devices activated in order to perform the safety measures.

When an error state is detected during monitoring the stationary state of the vehicle, at least one brake device of the vehicle may be activated as safety device. For example, this could be the control unit of the vehicle's braking system, which initiates a braking process when an error state is detected, in order in particular to bring the vehicle to a standstill as quickly as possible. This ensures that the vehicle does not roll away from a charging station during the charging process.

At least one charging process interruption device may be activated as safety device to interrupt the charging process when an error state is detected during monitoring of the charging process. The charging process interruption device may be an operable switch that disconnects the electric connection between the energy source and the electric store. Advantageously the method is not terminated after the charging process is interrupted, but is rather continued at least until it is ensured that there no longer exists a dangerous situation and that especially the external energy source was separated from the vehicle or the electric store, for example by unplugging or disconnecting the respective plug connection. Persons in and/or at the vehicle are protected especially from electric shock by the interruption of the charging process.

In the event that an error state is detected while monitoring the charging process, one advantageous development of the present invention provides for the activation of an information device as a safety device for indicating the detected error state especially to the driver of the vehicle, the operator of the external energy source and/or to the surroundings of the vehicle. The information device may be a visual or audible indicator that warns the driver, the operator of the energy source or any persons in the vicinity of the vehicle about the error state. Thus for example third parties may be warned not to touch the vehicle. The driver of the vehicle and the operator of the charging station or external energy source may be informed about the condition the detected error state, in particular by telecommunication.

Furthermore a documentation device may be provided that is activated as a safety device to record/document the error state when an error state is detected during monitoring of a charging process. This makes it possible to read out and analyze the error state later during diagnostics, for example during vehicle maintenance.

When detecting an error state while monitoring the charging process, at least one restriction device may be activated as a safety device to restrict driving functions of the vehicle, particularly as a function of the detected error state. For example, when an error state is detected, the restriction device disables the driving function of the vehicle, therefore not permitting the driver to continue driving the vehicle. This ensures the safety of the driver in case of an especially serious error state during the charging process, for example in case a short circuit in the vehicle system is detected.

The various safety devices described above may be activated additionally or alternatively to each other when an error state is detected. Which safety device is activated may depend on which safety devices the vehicle is equipped with and on the type of error state, which may require different safety measures. Particularly, at least the braking device as well as the charging process interruption device may be activated with each detected error state to ensure the safety of the driver of the vehicle as well as the operator of the charging station.

The device according to the present invention has the features described herein and is characterized by a specially prepared control unit encompassing arrangement for implementing the method described above.

The specially prepared control unit expediently includes at least one computer processor, which implements the method and operates the testing devices and safety devices accordingly.

A braking device, a charging process interruption device, an information device, a documentation device and/or a restriction device may be provided as the safety device of the vehicle. The functions of the various devices have already been explained above. As also described above, the device also includes at least one testing device comprising at least one or more sensors for monitoring the charging process as well as the stationary state of the vehicle. The at least one sensor for monitoring the stationary state of the vehicle may also be an optical sensor, which for example detects the road surface and detects a relative movement of the vehicle in relation to the road surface. Alternatively the sensor may be an rotational speed sensor, detecting the speed of rotation of at least one of the wheels of the vehicle.

The computer program according to the present invention performs all of the steps of the above method, if the program is running on a computer.

The computer program product according to the present invention having a program code stored to a machine-readable carrier carries out the method according to the present invention if the program is running on a computer.

The present invention is described below in greater detail with reference to the drawing.

BRIEF DESCRIPTION OF THE DRAWING

The FIGURE shows a vehicle at a charging station in a simplified illustration.

DETAILED DESCRIPTION

The FIGURE shows in a simplified illustration a vehicle 1, which is located at a charging station 2, forming an external energy source 3. Vehicle 1 has an electric motor 4 as drive device, which is mechanically connected with the driven wheels 5 of vehicle 1. An electric store 6 is associated with electric motor 4 to supply the electric motor with electrical energy. Electric store 6 has a corresponding connection socket 7, which is accessible from the outside and serves to connect with external energy source 3. Charging station 2 expediently has connector plug 8 for this purpose, which may be plugged into connection socket 7 in order to charge electric store 6.

In order to ensure the safety of persons in and/or at the vehicle or at the charging station during the charging process, vehicle 1 furthermore has a specially prepared control unit 9. Control unit 9 is connected to energy store 6 and optionally also to connection socket 7 in order to monitor the charging process and if necessary recognize or detect possibly occurring error states. For this purpose, control unit 9 is connected to a testing device 10, which has an associated electric store 6 and monitors the charge state using one or more sensors for example.

Control unit 9 is furthermore connected to multiple safety devices 11, 12, 13 and 14. In the present case, safety device 11 is a braking device 15, which may activate both brakes assigned to driven wheels 5 as well as brakes associated with non-driven wheels 16 as required.

Safety device 12 is a charging process interruption device 17, which is connected between connection socket 7 and electric store 6 and interrupts the electrical connection between electric store 6 and connection socket 7 if necessary. For this purpose, charging process interruption device 17 has at least one switch that may be activated by control unit 9 in particular.

Safety device 13 in the present case is an information device 18, which provides visual and/or audible information to the driver of vehicle 1, the operator of the charging station 2 and/or other persons in the vicinity of vehicle 1 about the charging process in particular. For example, information device 18 may be connected with a display on the vehicle's instrument board and/or an inwardly or outwardly directed speaker of vehicle 1.

Safety device 14 is configured as documentation device 19 and serves to store information about the charging process, as described in greater detail below.

Control unit 9 includes at least one processor (chip) for controlling the various devices of vehicle 1, in order to ensure the safety of the driver, of the operator of the charging station as well as other persons present in the vicinity during the charging process. Control unit 9 or its processor controls the devices as follows:

First the occurrence of a charging process is detected. For this purpose, vehicle 1 must be stationary to prevent connector plug 8 from detaching from connection socket 7 or to prevent the occurrence of critical tensions in the connecting cable. To this end, control unit 9 checks whether vehicle 1 is at rest. An additional testing device 20 is provided for this purpose, including in particular one sensor that detects the movement of one of wheels 16. If it is ascertained that the vehicle is not stationary, for example because wheel 16 is moving, testing device 20 signals an error state to control unit 9. In this case control unit 9 controls safety device 11 or braking device 15 in such a manner that the brake of at least one of wheels 5 and/or 16, the brakes of all wheels 5, 16 may be activated in order to bring vehicle 1 to a standstill as quickly as possible.

In addition or alternatively, control unit 9 receives information from testing device 10, which monitors the charging process. If testing device 10 determines that the charging process is faulty, for example because the charging currents are too high, it indicates an error state to control unit 9. Then control unit 9 controls safety device 12 so as to activate the switch of charging process interruption device 17, in order to interrupt the electrical connection between electric store 6 and external energy source 3 such that the charging process is terminated at least for the time being. At the same time, control unit 9 controls safety device 13 so as to inform at least the driver visually and/or audibly regarding the error state and if applicable about the interrupted charging process. At the same time, information device 18 may warn persons in the vicinity visually or audibly not to touch the vehicle.

Control unit 9 furthermore controls safety unit 14 in order to document or store the error state that has occurred so that the error state may be read out and analyzed in a later error analysis or routine check of vehicle 1.

Thus initially during a charging process only testing devices 20 and 10 are activated, while the remaining devices, especially safety devices 11 to 14, and the remaining system components of vehicle 1, which are not shown here in greater detail, remain deactivated. Only if an error state has been detected by one of testing devices 10 or 20 are additional safety devices 11 to 14 activated, as described above. In this instance, it is not necessary that all safety devices are activated. Rather, depending on the error state that has occurred, it is conceivable for example that only safety device 11 or safety device 12 is activated to protect the persons in the vicinity. Safety devices 11 and 12 are primary safety devices, while safety devices 13 and 14 may be more accurately described as secondary safety devices, since they do not directly ensure the safety of the persons.

Of course, the present invention is not limited to the safety devices 11 to 14 described above. Rather, a restriction device may also be provided, which in event of an error state is controlled by control unit 9 in such a manner that the driving functions of vehicle 1 are restricted. In this manner, for example, the driving operation of vehicle 1 is disabled after an error state is detected. It is also conceivable that information device 18 includes a telecommunication arrangement, making it possible to inform the driver or the operator of the charging station, even if they are not in the vicinity of the vehicle. For example, a short message (SMS) could conceivably be sent to the driver and/or the operator of charging station 2 when an error state occurs.

Overall, the present invention has the advantage that not all components of vehicle 1 are in operation and thus consuming energy during the charging process. Rather, components necessary to safeguard the driver or other persons, especially safety devices 11 to 14, are only activated or woken up when an error state occurs during the charging process. As a result the life of the individual components is extended overall and the consumption of energy is reduced. Only control unit 9 as well as testing devices 10 and 20 are constantly active during the charging process.

What is claimed is:

1. A method for operating a vehicle, which has at least one electric motor, as a drive device, that is associated with at least one electric store, the method comprising:
    charging the electric store by an external energy source when the vehicle is at rest;
    during the charging process, at least initially, activating only one testing device, located in the vehicle, to monitor the charging process and the stationary state of the vehicle; and
    only once an error state is detected by a testing device, activating at least one safety unit of the vehicle.

2. The method of claim 1, wherein at least one braking device of the vehicle is activated as a safety device when an error state is detected during monitoring of the stationary state of the vehicle.

3. The method of claim 1, wherein at least one charging process interruption device for interrupting the charging process is activated as a safety device when an error state is detected during monitoring of the charging process.

4. The method of claim 1, wherein an information unit is activated as a safety device when an error state is detected during monitoring of the charging process to indicate the detected error state to at least one of the driver of the vehicle, the operator of the external energy source, and the surroundings of the vehicle.

5. The method of claim 1, wherein a documentation device is activated as a safety device when an error state is detected during monitoring of the charging process to store/document the error state.

6. The method of claim 1, wherein at least one restriction device for restricting driving functions of the vehicle is activated as a safety device when an error state is detected during monitoring the charging process, including as a function of the detected error state.

7. A device for operating a vehicle, comprising:
    at least one electric motor, as a drive device, which is assigned an electric store, wherein the electric store is chargeable by an external energy source; and
    a control unit for performing the following:
        charging the electric store by an external energy source when the vehicle is at rest; during the charging process, at least initially, activating only one testing device, located in the vehicle, to monitor the charging process and the stationary state of the vehicle; and
        only once an error state is detected by a testing device, activating at least one safety unit of the vehicle.

8. The device of claim 7, wherein at least one of a braking device, a charging process interruption device, an information device, a documentation device, and a restriction device is provided as a safety device.

9. A computer readable medium having a computer program, which is executable by a processor, comprising:
    a program code arrangement having program code for operating a vehicle, which has at least one electric motor, as a drive device, that is associated with at least one electric store, by performing the following:
    charging the electric store by an external energy source when the vehicle is at rest;
    during the charging process, at least initially, activating only one testing device, located in the vehicle, to monitor the charging process and the stationary state of the vehicle; and
    only once an error state is detected by a testing device, activating at least one safety unit of the vehicle.

10. The computer readable medium of claim 9, wherein at least one braking device of the vehicle is activated as a safety device when an error state is detected during monitoring of the stationary state of the vehicle.

11. The computer readable medium of claim 9, wherein at least one charging process interruption device for interrupting the charging process is activated as a safety device when an error state is detected during monitoring of the charging process.

12. The computer readable medium of claim 9, wherein an information unit is activated as a safety device when an error state is detected during monitoring of the charging process to indicate the detected error state to at least one of the driver of the vehicle, the operator of the external energy source, and the surroundings of the vehicle.

13. The computer readable medium of claim 9, wherein a documentation device is activated as a safety device when an error state is detected during monitoring of the charging process to store/document the error state.

14. The computer readable medium of claim 9, wherein at least one restriction device for restricting driving functions of the vehicle is activated as a safety device when an error state is detected during monitoring the charging process, including as a function of the detected error state.

* * * * *